(12) United States Patent
Liang

(10) Patent No.: US 9,225,999 B2
(45) Date of Patent: Dec. 29, 2015

(54) VIRTUALIZED SECURITY PROCESSOR

(71) Applicant: Broadcom Corporation, Irvine, CA (US)

(72) Inventor: Victor Liang, Irvine, CA (US)

(73) Assignee: BROADCOM CORPORATION, Irvine, CA (US)

( * ) Notice: Subject to any disclaimer, the term of this patent is extended or adjusted under 35 U.S.C. 154(b) by 89 days.

(21) Appl. No.: 13/772,662

(22) Filed: Feb. 21, 2013

(65) Prior Publication Data

US 2014/0230073 A1 Aug. 14, 2014

Related U.S. Application Data

(60) Provisional application No. 61/763,204, filed on Feb. 11, 2013.

(51) Int. Cl.
 *G06F 21/60* (2013.01)
 *G06F 21/10* (2013.01)
 *H04N 21/00* (2011.01)

(52) U.S. Cl.
 CPC ............... *H04N 21/00* (2013.01); *G06F 21/10* (2013.01)

(58) Field of Classification Search
 USPC ........ 718/1, 100, 103; 725/25, 116, 118, 131; 726/1–4, 9, 11, 14, 26–30; 705/901; 709/226, 229, 231, 235, 203; 712/17, 712/25, 29
 See application file for complete search history.

(56) References Cited

U.S. PATENT DOCUMENTS

| | | | |
|---|---|---|---|
| 5,878,215 A * | 3/1999 | Kling et al. | 709/207 |
| 6,222,856 B1 * | 4/2001 | Krishnan et al. | 370/468 |
| 8,424,007 B1 * | 4/2013 | Hernacki et al. | 718/103 |
| 8,689,282 B1 * | 4/2014 | Oprea et al. | 726/1 |
| 2002/0073337 A1 * | 6/2002 | Ioele et al. | 713/201 |
| 2007/0112772 A1 * | 5/2007 | Morgan et al. | 707/9 |
| 2008/0320278 A1 * | 12/2008 | Liang et al. | 712/29 |
| 2010/0064072 A1 * | 3/2010 | Tang et al. | 710/39 |
| 2010/0083362 A1 * | 4/2010 | Francisco | 726/9 |
| 2010/0257602 A1 * | 10/2010 | Kettler et al. | 726/19 |
| 2011/0296069 A1 * | 12/2011 | Tarta et al. | 710/200 |
| 2013/0042115 A1 * | 2/2013 | Sweet et al. | 713/176 |

(Continued)

OTHER PUBLICATIONS

Tarek F. Abdelzaher et al, Web Server QoS Management by Adaptive Content Delivery, pp. 216-225, IEEE, 1999.*

(Continued)

*Primary Examiner* — Shanto M Abedin
(74) *Attorney, Agent, or Firm* — Foley & Lardner LLP

(57) ABSTRACT

Aspects of a virtualized security processor are described herein. In various embodiments, one or more virtual security modules may be instantiated at a port interface between a security module and a processing environment of a host device. In one embodiment, a virtual security module is instantiated for each service of the host device. Each virtual security module is configured for at least one command supported by the security module for an associated service of the host device. After being configured, a virtual security module may receive a security command request from an associated service and, before submitting the security command request to the security module, verify and prioritize the security command request. In certain aspects, the use of virtual security modules assists the host device to interface multiple services with the security module, while prioritizing tasks for and offloading certain tasks from the security module.

18 Claims, 10 Drawing Sheets

(56) References Cited

U.S. PATENT DOCUMENTS

| | | | |
|---|---|---|---|
| 2013/0227550 A1* | 8/2013 | Weinstein et al. | 718/1 |
| 2013/0291062 A1* | 10/2013 | Bursell | 726/4 |
| 2014/0053226 A1* | 2/2014 | Fadida et al. | 726/1 |

OTHER PUBLICATIONS

Onur Acricmez et al, A Secure DVB Set-top Box via Trusting Computing Technologies, pp. 1-8, IEEE, 2009.*

* cited by examiner

VIRTUALIZED SECURITY PROCESSOR

CROSS-REFERENCE TO RELATED APPLICATIONS

This application claims the benefit of and priority to U.S. Provisional Application Ser. No. 61/763,204, filed Feb. 11, 2013, the entire contents of which is hereby incorporated herein by reference.

BACKGROUND

Security microprocessors or modules are relied upon in many host devices, such as broadband cable, satellite, and internet protocol television receivers, for example. Although specific features may vary among security module variants, a security module generally comprises a dedicated, separate, microprocessor that incorporates and/or executes security features and functions such as keyladder, secure hash algorithm (SHA), keyed-hashing for message authentication (HMAC), and Rivest, Shamir, and Adleman (RSA) functions, among others. A security module may also provide specific security features for certain conditional access service (CAS) and digital rights management (DRM) services.

Generally, host devices are not permitted access to implementation and processing details (e.g., registers, memories, intermediate results, etc.) of security modules. Thus, security may be enhanced by the use of security modules. However, security modules may be relatively limited in computational power and memory. A typical security command cycle for a security module may take milliseconds of processing time, which is a relatively long time, especially compared to the rate at which host processors execute instructions.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
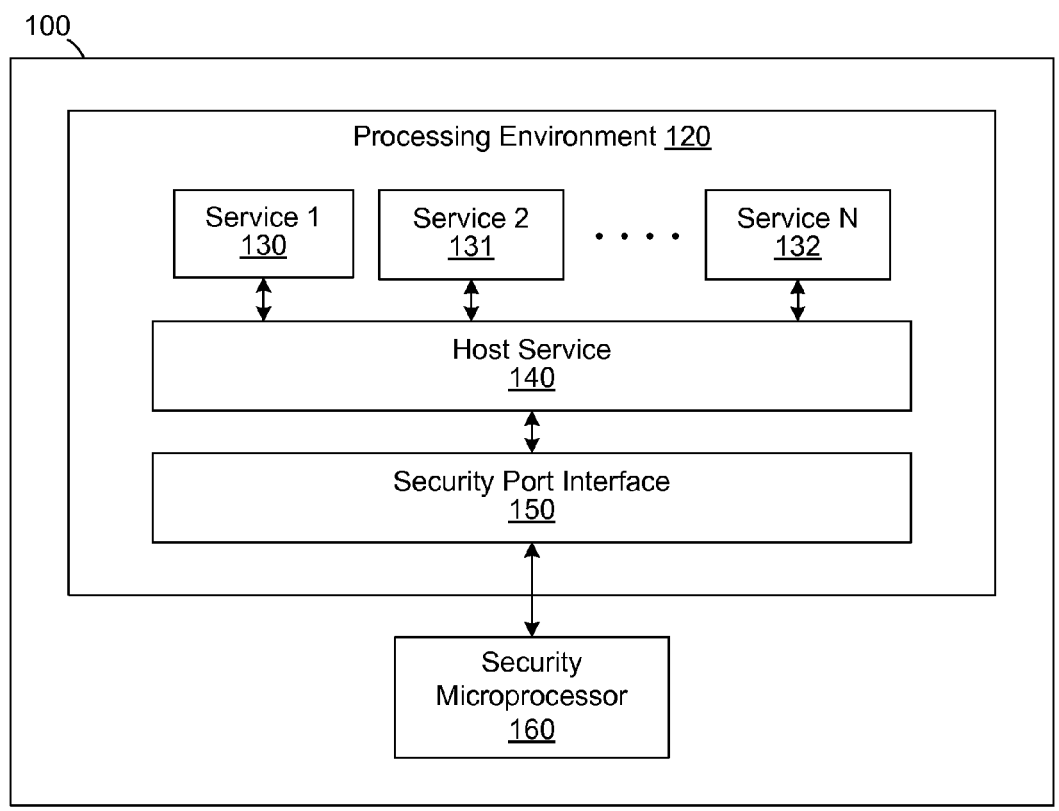
FIG. 1 illustrates a host device of various services according to an example embodiment.

Security microprocessors or modules are relied upon in many host devices, such as broadband cable, satellite, and internet protocol television receivers, for example, for security features and functions such as keyladder, SHA, HMAC, and RSA functions, among others. A security module may provide specific security features for certain CAS and DRM services. Generally, host devices are not permitted access to implementation and processing details of security modules. Thus, security may be enhanced by the use of security modules. However, security modules may be relatively limited in computational power and memory. In this context, effective use of a security module is of concern because important services of host devices rely upon security function output results from the security module for operation.

The embodiments described herein relate to one or more virtual security modules that act as a proxy for a security module. Each of the virtual security modules acts as a proxy between applications or services executing on a host and the security module, for example, to enforce communication channels, enforce security rules and policies, communicate datagrams and commands, and set priorities for various operations. Aspects of the embodiments described herein may be relied upon to reduce a computational load of a security module relied upon by a host device, improving efficiency without compromising security. Thus, the embodiments described herein help to resolve some problems related to the limited computational bandwidth of security modules.

In other aspects, the embodiments described herein may be relied upon to personalize a security module with distinct rules and policies for different applications or services of a host, such as CAS and DRM services. It is noted that conventional host devices were generally limited to hosting a single service, such as a single cable or satellite television service. However, according to aspects of the embodiments described herein, more than one service, such as cable, satellite television, digital video recorder (DVR), TiVo®, Netflix®, Hulu®, Vudo®, or other services, may be integrated into a single host device, even while maintaining security between them. For example, each service may have its own unique virtual security module, running simultaneously with other virtual processors, enabling multiple CAS/DRM services to operate concurrently. Thus, the embodiments provide a security solution for hybrid devices of various services.

In various embodiments, one or more virtual security modules may be instantiated at a port interface between a security module and a processing environment of a host device. In one embodiment, a virtual security module is instantiated for each service of the host device. Each virtual security module is configured for at least one command supported by the security module for an associated service of the host device. After being configured, a virtual security module may receive a security command request from an associated service and, before submitting the security command request to the security module, verify and prioritize the security command request. In certain aspects, the use of virtual security modules assists a host device with interfacing multiple services with a security module, while prioritizing and offloading certain tasks from the security module.

Turning now to the drawings, a general description of exemplary embodiments of a host device is provided, followed by a discussion of the operation of the same.

FIG. 1 illustrates a host device 100 of various services according to an example embodiment. The host device 100 comprises a processing environment 120 and a security microprocessor or module 160. The processing environment 120 may be embodied by a computing architecture such as that illustrated in FIG. 10 and described below. That is, the processing environment 120 may be embodied by one or more general or specific purpose processors and memory circuits, modules, and devices, to support the features, functions, and logic of the services hosted by the processing environment 120, as further described below.

In various embodiments, the security microprocessor or module (SM) 160 manages digital keys, accelerates certain cryptographic processes, such as keyladder, SHA, HMAC, and RSA processes or functions, and supports the security requirements of the services hosted by the processing environment 120. Additionally, the SM 160 may securely generate and/or store sensitive data for services of the processing environment 120.

In other aspects, the SM 160 provides logical and physical security for the sensitive data of the services hosted by the processing environment 120. The SM 160 may comprise a physical device in the form of an ISO 7816 smartcard or similar module, for example, and may be removable from the host device 100. Various services supported by the processing environment 120 rely upon security function output results from the SM 160 for operation. As noted above, the SM 160 may provide specific security features for certain CAS and DRM services.

The processing environment 120 comprises or executes one or more services including, for example, service 1 to service N, illustrated at reference numerals 130-132. The processing environment 120 further comprises or executes a host service 140 and a security port interface 150. In one embodiment, the services 1 to N 130-132 may include, in various embodiments, one or more cable or satellite television applications or services. One or more of the services 1 to N 130-132 may include CAS or DRM services that rely upon specific security function output results from the SM 160 for operation.

The host service 140, generally, comprises an underlying and supporting service layer of the processing environment 120 of the host device 100. In certain aspects, the host service 140 coordinates the operation and execution of the services 1 to N 130-132 for the host device 100. In this context, the host service 140 also receives datagrams and requests from the services 1 to N 130-132 for communication to the SM 160, as needed for operation. These datagrams and requests are passed by the host service 140 to the security port interface 150 for communication to the SM 160.

As one example, the security port interface 150 receives a security command request including, for instance, a command to generate and route a key for conditional access from one of the services 1 to N 130-132. The security port interface 150 then writes the security command request to an input command buffer of the SM 160 and triggers an interrupt to the SM 160. The SM 160, in turn, processes the security command request, writes a result to an output buffer, and triggers an interrupt to the security port interface 150. The security port interface 150 then retrieves the result and provides it to the requesting service.

It is noted that the security command request process cycle described above may take milliseconds to complete. Thus, depending upon a number of the services 1 to N 130-132 supported by the processing environment 120, the SM 160 may be unable to support all security command requests effectively. Furthermore, the security port interface 150 in FIG. 1 offers little or no run time customization for supporting the services 1 to N 130-132. Instead, any customization may be static or fixed in the host device 100, by relying upon certain, predefined, CAS/DRAM service functions of the SM 160. Thus, the SM 160, alone, determines if a data, a command, or a request received from the security port interface 150 is valid or permitted based on set policies. In other words, the security port interface 150 serves as a passive conduit, rather than an active engine in rule processing for datagrams and commands communicated to the SM 160. If two CAS and DRM services are concurrently supported, the security port interface 150 offers no separated port interface instances to protect the privacies of the different CAS/DRM services.

As an extension of the host device 100 of FIG. 1 described above, embodiments of a virtualized security host device 200 that optimizes use of a security microprocessor 260 is described below with reference to FIG. 2. Among other features, the virtualized security host device 200 provides a dynamic, multiple-instance, security port interface that may be effectively customized at run time for concurrent CAS and DRM services.

Figure 2:
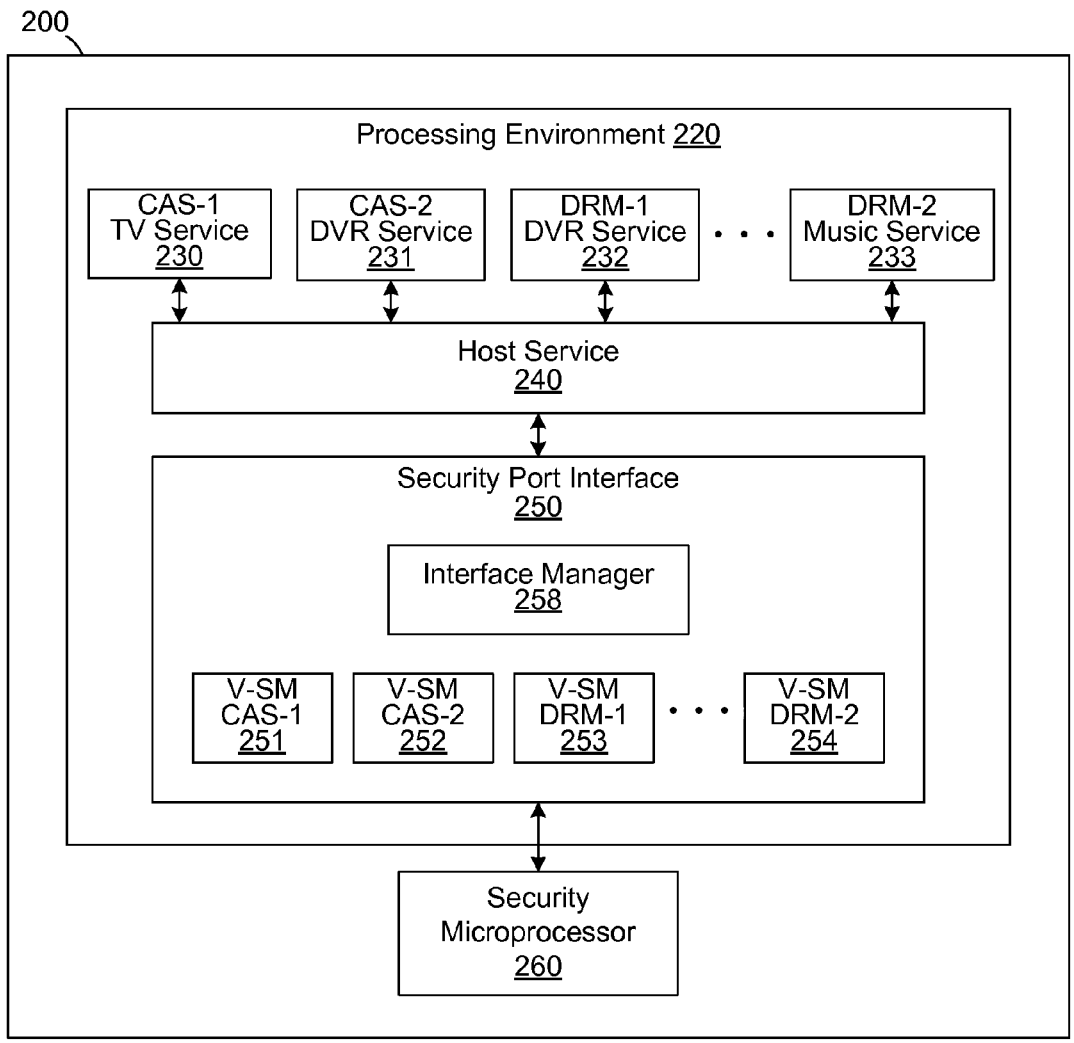
FIG. 2 illustrates a virtualized security host device including virtual security modules according to an example embodiment.

FIG. 2 illustrates a virtualized security host device 200 including virtual security modules according to an example embodiment. The virtualized security host device 200 comprises a processing environment 220 and a security microprocessor 260. The processing environment 220 may be embodied by a computing architecture such as that illustrated in FIG. 10, and is similar in certain aspects to the processing environment 120 of FIG. 1. The security microprocessor or module (SM) 260 comprises a security module similar in certain aspects to the SM 160 of FIG. 1. That is, in various embodiments, the SM 260 manages digital keys, accelerates certain cryptographic processes, such as keyladder, SHA, HMAC, and RSA processes or functions, and supports the security requirements of the services hosted by the processing environment 220.

The processing environment 220 comprises or executes one or more services including, for example, the CAS-1 TV service 230 (service 230), the CAS-2 DVR service 231 (service 231), the DRM-1 DVR service 232 (service 232), and the DRM-2 music service 233 (service 233). The services 230-233 are provided by way of example only and other additional or alternative services are within the scope and spirit of the embodiments described herein. The services 230-233 may include, in various embodiments, one or more CAS or DRM cable or satellite television, music, or other multimedia content applications or services, such as DVR, TiVo®, Netflix®, Hulu®, Vudo®, or others. The CAS or DRM nature of the services 230-233 is not intended to be limited to any particular conditional access or digital rights management features or requirements of the services 230-233. Instead, it is noted that the CAS or DRM particulars of the services 230-233 require, in certain aspects, security function output results from the SM 260 for some features of operation. Thus, one or more of the services 230-233 may not function, or may not function fully, without the security function output results from the SM 260.

The processing environment 220 further comprises or executes a host service 240 and a security port interface 250. The host service 240 is similar to the host service 140 of the host device 100 of FIG. 1. However, while the security port interface 250 receives and forwards security command requests from the services 230-233 to the SM 260, the security port interface 250 comprises additional logic and performs additional functions as compared to the security port interface 150 of the host device 100 of FIG. 1.

In the example embodiment illustrated in FIG. 2, the security port interface 250 comprises several virtual security modules (V-SMs) including V-SM CAS-1 251, V-SM CAS-2 252, V-SM DRM-1 253, and V-SM DRM-2 254. The security port interface 250 also comprises an interface manager 258 that initializes the security port interface 250, instantiates V-SMs for the security port interface 250, and configures the V-SMs. The V-SMs 251-254 are instantiated and configured, respectively, for the services 230-233 of the processing environment 220, as further described below. Each of the V-SMs 251-254 acts as a proxy between one of the services 230-233 and the SM 260, for example, to enforce communication channels, enforce security rules and policies, communicate datagrams and commands, and set priorities for various operations. In some aspects, the V-SMs 251-254 may reduce a computational load of the SM 260, improving efficiency without compromising security.

In view of the V-SMs 251-254, the security port interface 250 of the virtualized security host device 200 of FIG. 2 offers certain run time customizations for supporting the services 230-233. Thus, the security port interface 250 serves as an active engine in rule processing for datagrams and commands communicated to the SM 260 from the services 230-233. Further, as the services 230-233 comprise separate and concurrently-supported CAS and DRM services, the security port interface 250 offers separated port interface instances to protect the privacies of the different CAS/DRM services.

With reference to FIGS. 3-9 below, a description of the instantiation and configuration of the V-SMs 251-254 is provided by way of various flow and command sequence communications diagrams. Further, a description of the operation of the V-SMs 251-254 is provided, to highlight certain security and policy rule enforcement, priority, data integrity, and efficiency aspects of the V-SMs 251-254.

Figure 3:
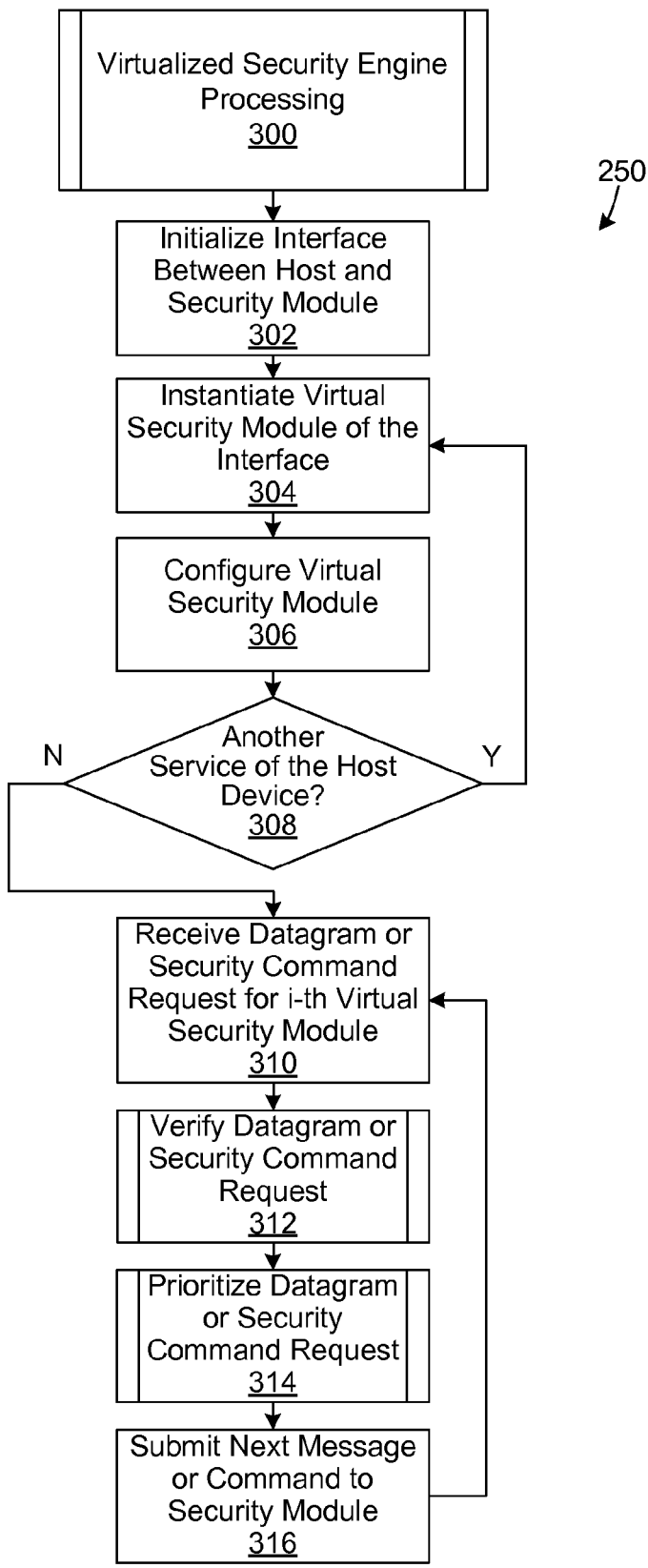
FIG. 3 illustrates a process flow diagram for virtualized security processing performed by the virtualized security host device of FIG. 2 according to an example embodiment.
Figure 7:
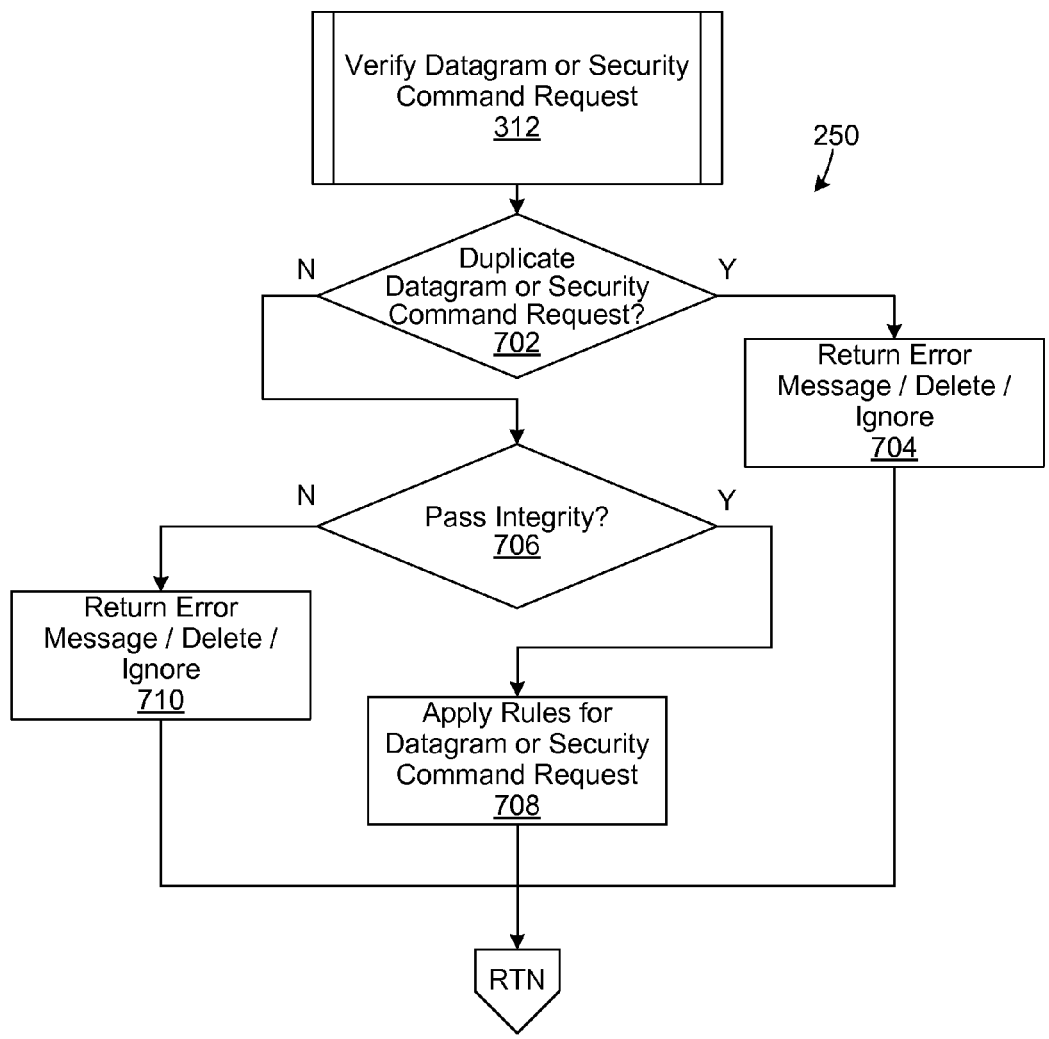
FIG. 7 illustrates a process flow diagram for a process of verifying a datagram message or security command request performed by the virtualized security host device of FIG. 2 according to an example embodiment.
Figure 8:
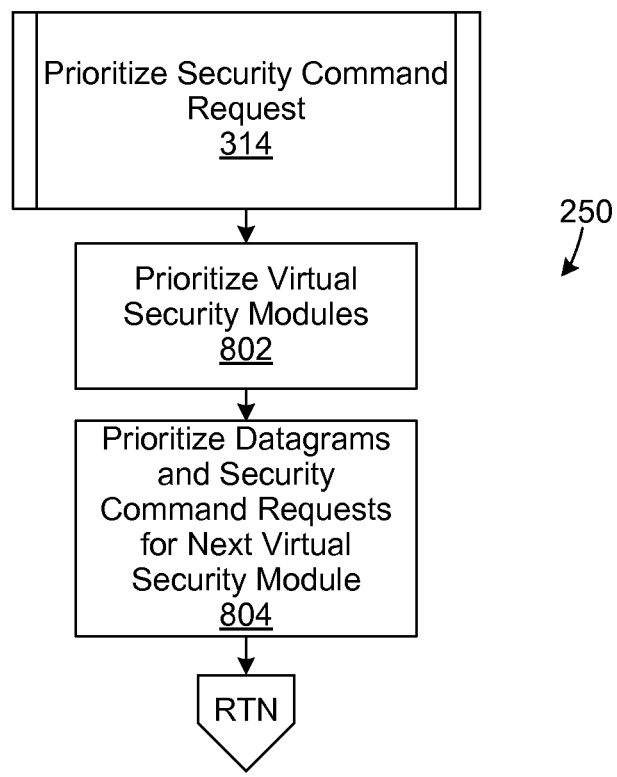
FIG. 8 illustrates a process flow diagram for a process of prioritizing a security command request performed by the virtualized security host device of FIG. 2 according to an example embodiment.

Referring to FIGS. 3, 7, and 8, process flow diagrams illustrating example processes performed by the processing environment 220 of the virtualized security host device 200 of FIG. 2 are provided. It should be appreciated that the flowcharts of FIGS. 3, 7, and 8 provide merely one example functional arrangement that may be employed to implement the operations of the processing environment 220, as described herein. In certain aspects, the flowcharts of FIGS. 3, 7, and 8 may be viewed as depicting an example of steps performed by the processing environment 220 according to one or more embodiments. In alternative embodiments, environments similar to the processing environment 220 may perform the processes illustrated in FIGS. 3, 7, and 8.

Turning to FIG. 3, a process flow diagram for a process 300 of virtualized security processing performed by the virtualized security host device 200 of FIG. 2 according to an example embodiment is illustrated. At reference numeral 302, interface manager 258 of the security port interface 250 (FIG. 1) initializes itself for instantiation of V-SMs. Initialization at reference numeral 302 includes a profile discovery command exchange sequence.

Figure 4:
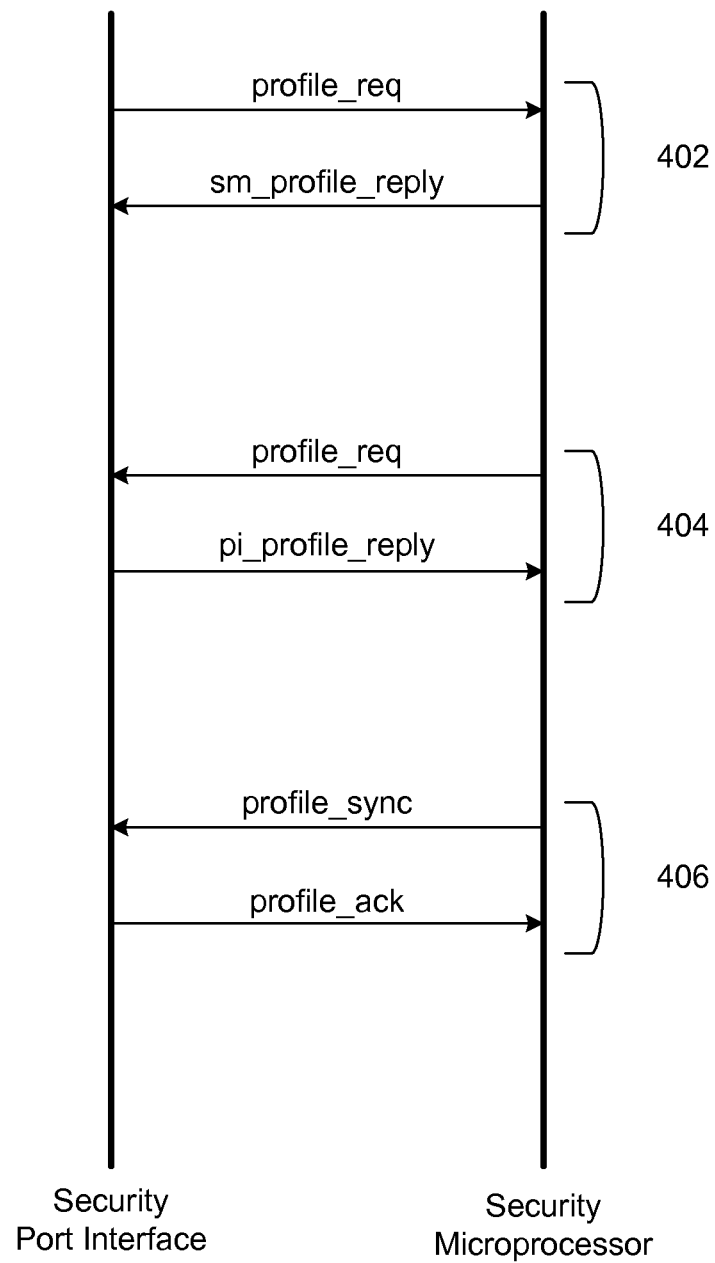
FIG. 4 illustrates a profile discovery command exchange sequence between an interface of the virtualized security host device and a security module of FIG. 2 according to an example embodiment.

In this context, FIG. 4 illustrates a profile discovery command exchange sequence between the security port interface 250 and the SM 260 of FIG. 2 according to an example embodiment. First, in exchange 402 of FIG. 4, the interface manager 258 sends a profile request message, profile_req, to the SM 260. An example protocol/syntax structure of the profile_req message is provided below in Table 1. In response, the SM 260 replies with a profile reply message, sm_profile_reply, which includes hardware and firmware version information of the SM 260, as provided in Table 2 below.

Further, in exchange 404 of FIG. 4, the SM 260 sends a profile_req message to the security port interface 250. In response, the security port interface 250 replies with a pi_profile_reply message including host device system-on-chip (SoC) version, revision version, and security port interface version information, for example, as provided in Table 3 below. It is noted that the sm_profile_reply and pi_profile_reply messages in Tables 2 and 3 are provided by way of example only and are not intended to be limiting, as additional or alternative information may be provided or communicated in the messages.

After the exchanges 402 and 404, if the security port interface 250 supports the hardware and firmware versions (and any other profile information) of the SM 260, then the interface manager 258 sends a profile_sync request, as provided in Table 4, to the SM 260 in the exchange 406 of FIG. 4. In turn, if the SM 260 also supports the host and security port interface hardware, firmware, and software versions (and any other profile information), then the SM 260 acknowledges the profile_sync request by a profile_ack reply, as provided in Table 5.

TABLE 1

| Command | Field | Comment |
| --- | --- | --- |
| profile_req ( ) | { profile_req_tag } | Identifier |

TABLE 2

| Command | Field | Comment |
| --- | --- | --- |
| sm_profile_reply ( ) | { sm_profile_reply_tag sm_hw_version sm_fw_version } | Identifier SM hardware version SM firmware version |

TABLE 3

| Command | Field | Comments |
| --- | --- | --- |
| pi_profile_reply ( ) | { pi_profile_reply_tag host_soc_version host_soc_revision host_pi_version } | Identifier Host Device SoC version Host Device SoC revision Host Security PI version |

TABLE 4

| Command | Field | Comment |
|---|---|---|
| profile_sync ( ) | {<br>profile_sync_tag<br>} | Identifier |

TABLE 5

| Command | Field | Comments |
|---|---|---|
| profile_ack ( ) | {<br>profile_ack_tag<br>} | Identifier |

Returning back to the process 300 of FIG. 3, if the interface manager 258 of the security port interface 250 and the SM 260 agree on profiles at reference numeral 302 of FIG. 3, then the process 300 proceeds to reference numeral 304, where the interface manager 258 (FIG. 1) instantiates a V-SM of the security port interface 250. For example, at reference numeral 304, the interface manager 258 may instantiate the virtual security module V-SM CAS-1 251. As described above, the virtual security module V-SM CAS-1 251 may be instantiated as a proxy between the CAS-1 TV service 230 of the processing environment 220 and the SM 260. Instantiation is performed, at least in part, via a profile discovery command exchange of CAS or DRM system information for a particular service, for example, between the security port interface 250 and the SM 260.

Figure 5:
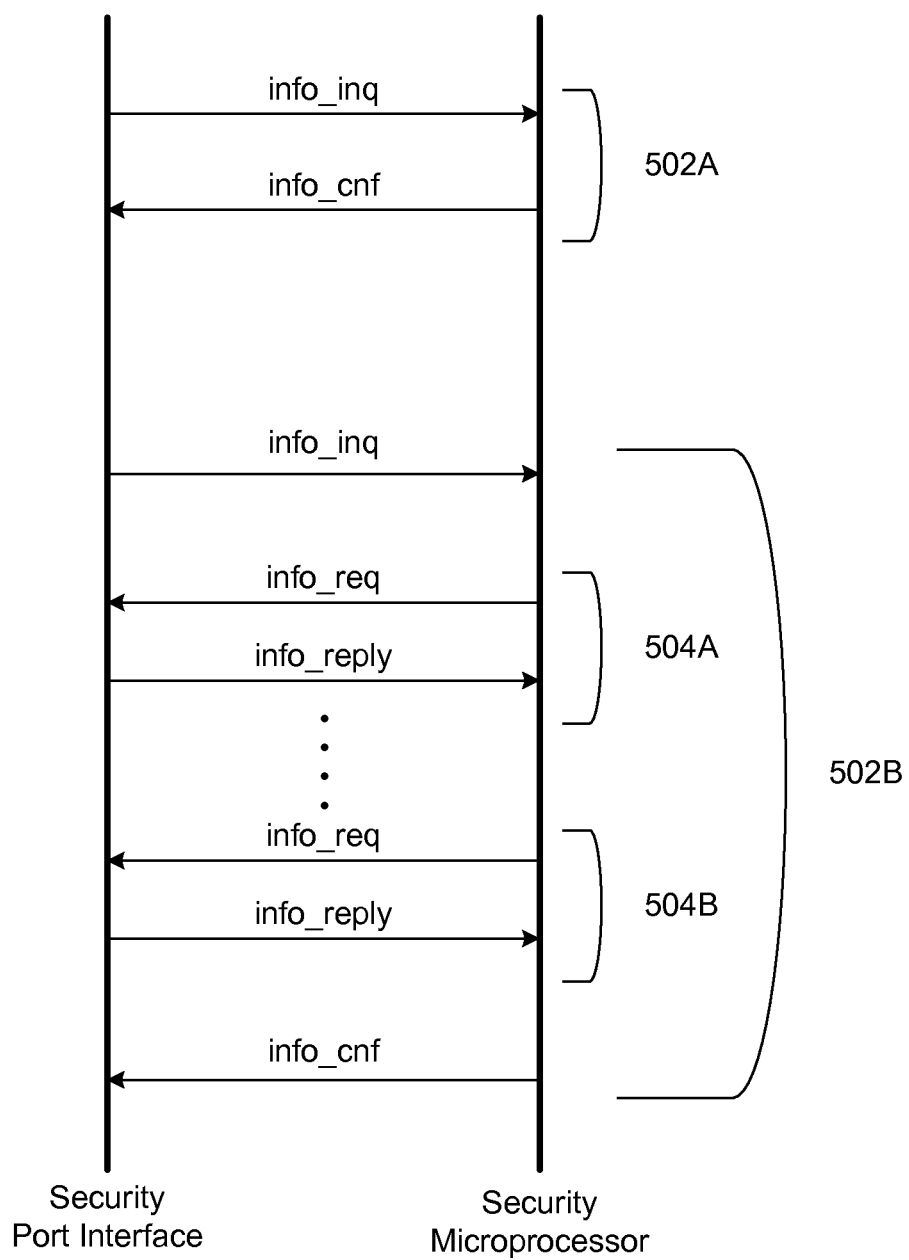
FIG. 5 illustrates a sequence of instantiation commands communicated between the interface of the virtualized security host device and the security microprocessor of FIG. 2 according to an example embodiment.

In this context, FIG. 5 illustrates a profile discovery command exchange sequence between the security port interface 250 of the virtualized security host device 200 and the SM 260 of FIG. 2 according to an example embodiment. As illustrated, in exchange 502A, the interface manager 258 and/or the V-SM CAS-1 251 sends an info_inq message with a system_id identifier to the SM 260, as provided in Table 6. In various embodiments, the system_id may identify one of the services 230-233 of the processing environment 220 and/or one of the V-SMs of the security port interface 250 of FIG. 1, such as the CAS-1 TV service 230 and/or the V-SM CAS-1 251. In response, the SM 260 confirms whether the service identified by the system_id identifier is supported, by replying with an info_cnf message to the security port interface 250, as provided in Table 7. It is noted that, in some embodiments, depending upon whether the identified system or service is associated with a CAS or DRM security profile, the info_inq and info_cnf messages may specify or be further tailored for either CAS or DRM profiles. It is noted that the info_inq and info_cnf messages in Tables 6 and 7 are provided by way of example only and are not intended to be limiting, as additional or alternative information may be provided or communicated in the messages.

In some embodiments, certain secret information may also be exchanged between or among the info_inq and info_cnf messages, depending upon the requirements of CAS-1 TV service 230 for which the V-SM CAS-1 251 is being instantiated. If an exchange of detailed CAS secret information is needed for security purposes, such as to authenticate the host device 200, then the exchange 502B of FIG. 5 may be relied upon. In the exchange 502B, one or more nested exchange iterations 504A, 504B, etc. of CAS information request info_req messages, as provided in Table 8, and CAS information reply info_reply messages, as provided in Table 9, may be exchanged between the security port interface 250 and the SM 260. It is noted that, among embodiments, the syntax of the info_req and info_reply messages may vary for CAS or DRM profile requirements. At the end of the exchange 502B of FIG. 5, after the exchange of the CAS secret information, the SM 260 sends an info_cnf message to the security port interface 250, to indicate whether the CAS system is supported by the SM 260. It is noted that the info_req and info_reply messages in Tables 8 and 9 are provided by way of example only and are not intended to be limiting, as additional or alternative information may be provided or communicated in the messages.

Based on the profile discovery command exchange sequence of FIG. 5, the interface manager 258 may instantiate a specific V-SM instance (e.g., the V-SM CAS-1 251 instance) for the requesting service (e.g., the CAS-1 TV service 230). Thus, for example, future communications between the processing environment 220 and the SM 260 for the CAS-1 TV service 230 are handled by the instantiated V-SM CAS-1 251 instance.

TABLE 6

| Command | Field | Comment |
|---|---|---|
| info_inq ( ) | {<br>info_inq_tag<br>system_id<br>} | Identifier<br>CAS or DRM system id,<br>for example |

TABLE 7

| Command | Field | Comment |
|---|---|---|
| info_cnf ( ) | {<br>info_inq_tag<br>Error_code<br><br><br><br>} | Identifier<br>e.g.,<br>0x00 = System or service supported<br>0x01 = System or service not supported |

TABLE 8

| Command | Field | Comment |
|---|---|---|
| info_req ( ) | {<br>info_req_tag<br>info_req_data<br>} | Identifier<br>Details on data requested |

TABLE 9

| Command | Field | Comment |
|---|---|---|
| info_reply ( ) | {<br>info_reply_tag<br>info_reply_data<br>} | Identifier<br>Reply data for return |

Referring back to the process 300 of FIG. 3, after a V-SM is instantiated at reference numeral 304, the V-SM discovers and configures certain communication protocols for use at reference numeral 306. For example, as the virtual security module V-SM CAS-1 251 is instantiated as a proxy between the CAS-1 TV service 230 of the processing environment 220 and the SM 260, the V-SM CAS-1 251 is configured for the use of certain commands in connection with the CAS-1 TV service 230. Configuration of the V-SM CAS-1 251 at reference numeral 306 is performed by establishing permitted datagrams and/or commands for communication between the V-SM CAS-1 251 and the SM 260.

Figure 6:
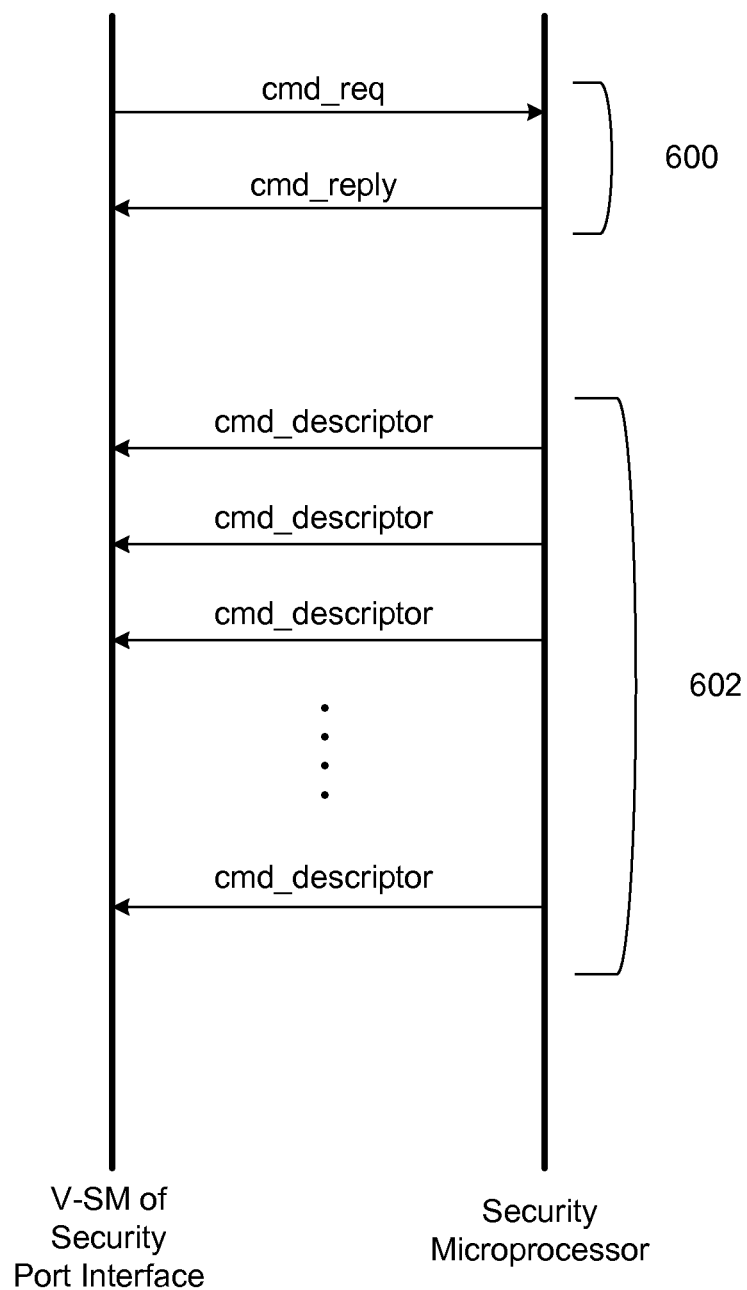
FIG. 6 illustrates a sequence of configuration commands communicated between the interface of the virtualized security host device and the security microprocessor of FIG. 2 according to an example embodiment.

In this context, FIG. 6 illustrates a sequence of configuration commands communicated between the security port interface 250 of the virtualized security host device 200 and the SM 260 of FIG. 2 according to an example embodiment. As illustrated, in exchange 600, the interface manager 258 and/or the V-SM CAS-1 251 sends a cmd_inq message to the SM 260, as provided in Table 10. In response, the SM 260 sends a cmd_reply message, as provided in Table 11, to the interface manager 258 and/or the V-SM CAS-1 251. The cmd_reply message specifies a system_id of a certain V-SM or service for the commands listed in the reply. The cmd_reply message also includes a list of permitted commands, each including a cmd_id identifier and a cmd_descriptor command descriptor. The cmd_reply message includes a list of permitted commands for a specific V-SM, specified by the system_id, and further details on each of the listed commands are received in subsequent cmd_descriptor messages, in the exchange 602 of FIG. 6.

In the exchange 602 of FIG. 6, after receiving a cmd_reply message, the interface manager 258 and/or the V-SM specified in the cmd_reply message receives details from the SM 260 for each of the permitted commands listed in the cmd_reply message. In Table 12 below, further example details on the syntax of the cmd_descriptor messages is provided. Particularly, each cmd_descriptor message includes a descriptor_tag identifier of a command, a priority for the command, and implementation, execution, and/or syntax command details for the command.

Tables 13 and 14 below show example command lists for CAS and DRM systems, respectively. It is noted that some commands are common between the two. For example, certain standard commands such as configure_crypto_algorithm, configure_key_slot, etc. are shared between the lists of permitted commands. It is also noted that certain commands vary between the two lists. For example, the DRM list in Table 14 includes certain DRM-specific commands which are not published or permitted for a CAS system, such as the marlin_key commands.

Each command in Tables 13 and 14 is associated with a priority. Using the command priorities, the V-SM may prioritize a queue of commands to more effectively use the SM 260, which comprises a limited computational resource. For example, video decryption related commands, such as the generation and routing of keys, may be of the highest priority because video content keys are frequently refreshed for security purposes. As will be detailed later, a V-SM may use the priority information to decide how to en-queue and de-queue commands.

TABLE 10

| Command | Field | Comment |
|---|---|---|
| cmd_req ( ) | { | |
|  | cmd_req_tag | Identifier |
|  | v_sm_id | V-SM identifier, a unique ID for the V-SM |
|  | system_id | CAS or DRM system identifier |
|  | } | |

TABLE 11

| Command | Field | Comment |
|---|---|---|
| cmd_reply ( ) | { | |
|  | cmd_reply_tag | Identifier |
|  | v_sm_id | V-SM identifier, a unique ID for the V-SM |
|  | system_id | CAS or DRM system identifier |
|  | For (i=0; i < N; i++) { | N commands allowed |
|  | cmd_id | Command identifier |
|  | cmd_descriptor ( ) | Command descriptor |
|  | } | |
|  | } | |

TABLE 12

| Command | Field | Comment |
|---|---|---|
| cmd_descriptor ( ) | { | |
|  | descriptor_tag | Identifier |
|  | priority | e.g. [0, 2] |
|  |  | 0: low priority |
|  |  | 1: medium priority |
|  |  | 2: high priority |
|  | command_info | Details on the comand |
|  | } | |

TABLE 13

| Command | Priority | Usage | Comment |
|---|---|---|---|
| configure_crypto_algorithm | medium | Configure crypto-algorithm, e.g. AES-ECB mode for decryption of MPEG-2 transport stream | |
| configure_key_slot | medium | Configure a keyslot to store a key associated with the crypto-algorithm, e.g. AES-ECB. | |
| generate_key | high | Generate key based on information such as MPEG-2 EMM and ECM tables | High priority because timing is critical for decryption of MPEG-2 TS video, which may periodically switch keys |
| route_key | high | Route generated key to destination keyslot | High priority because timing is critical for |

TABLE 13-continued

| Command | Priority | Usage | Comment |
|---|---|---|---|
| | | | decryption of MPEG-2 TS video, which may periodically switch keys |
| RSA_init | low | Initialize RSA keyslots and load RSA keys into the keyslots | RSA related commands are of lower priority because they are high computational complexity |
| RSA_decrypt | low | Decrypt a message using the selected RSA private key | |
| RSA_encrypt | low | Encrypt a message using the selected RSA public key | |
| RSA_sign | low | Sign a message to generate signature using the selected RSA private key | |
| RSA_verify | low | Verify a signature using the selected RSA public key | |

TABLE 14

| Command | priority | Usage | Comments |
|---|---|---|---|
| configure_crypto_algorithm | medium | Configure crypto-algorithm, e.g. AES-ECB mode for decryption of MPEG-2 transport stream | |
| configure_key_slot | medium | Configure a keyslot to store a key associated with the crypto-algorithm, e.g. AES-ECB. | |
| generate_key | high | Generate key based on information such as MPEG-2 EMM and ECM tables | High priority because timing is critical for decryption of MPEG-2 TS video, which may periodically switch keys |
| route_key | high | Route the generated key to the destination keyslot as mentioned above. | High priority because timing is critical for decryption of MPEG-2 TS video, which may periodically switch keys |
| RSA_init | low | Initialize RSA keyslots and load RSA keys into the keyslots | RSA related commands are of lower priority because they are high computational complexity |
| RSA_decrypt | low | Decrypt a message using the selected RSA private key | |
| RSA_encrypt | low | Encrypt a message using the selected RSA public key | |
| RSA_sign | low | Sign a message to generate signature using the selected RSA private key | |

TABLE 14-continued

| Command | priority | Usage | Comments |
|---|---|---|---|
| RSA_verify | low | Verify a signature using the selected RSA public key | |
| export_marlin_key | medium | Export a marlin DRM key from V-SM to host | |
| import_marlin_key | medium | Import a marlin DRM key from host to V-SM | |
| load_marlin_key | high | Generate and load the marlin content key for video decryption | High priority because timing is critical for video decryption |
| route_marlin_key | high | Route the marlin content key to the destination keyslot for video decryption | High priority because timing is critical for video decryption |

Referring back to the process 300 of FIG. 3, after the V-SM CAS-1 251 is configured at reference numeral 308, the process 300 proceeds to reference numeral 308, where the interface manager 258 determines whether another service of the virtualized security host device 200 is supported or executed by the processing environment 220. If another service is supported, then the process 300 proceeds back to reference numeral 304, where the interface manager 258 instantiates another V-SM for the service. Additionally, the V-SM is configured at reference numeral 306. Thus, among reference numerals 304, 306, and 308, a V-SM is instantiated and configured for each of the services supported by the processing environment 220. In the example embodiment illustrated in FIG. 2, a V-SM is instantiated and configured for each of the services 230-233.

After a V-SM is instantiated and configured for each of the services 230-233, the process 300 proceeds from reference numeral 308 to reference numeral 310. It is noted that, when the process 300 proceeds to reference numeral 310, all V-SMs of the security port interface 250 have been instantiated and configured for use. At this point, the V-SMs are prepared to enforce security rules and policies, communicate datagrams and commands, and set priorities for various operations for respective ones of the services 230-233.

At reference numeral 310, the security port interface 250 receives a datagram message or security command request, for example, from one of the services 230-233. The received message or request is attributed to one of the V-SMs based on identification information relied upon when instantiating and configuring the V-SM. The datagram message or security command request may comprise data for review or processing by the SM 260 and/or an instruction or request for execution or processing of a security-related command, for example.

At reference numeral 312, the received datagram message or security command request is verified by an associated V-SM. For example, at reference numeral 312, the received security command request is examined for integrity, duplication, and/or other rules of the V-SM. These rules may comprise the rules configured in the processes at reference numerals 304 and 306, for example. In certain aspects, these rules can offset processing requirements of the SM 260, and prevent erroneous commands or datagrams from being communicated to the SM 260. Further details of the processes performed at reference numeral 312 are described in further detail below with reference to FIG. 7.

At reference numeral 314, received datagram messages or security command requests are prioritized, in various embodiments, among the V-SMs and/or within each individual V-SM. In this manner, several datagram messages and security command requests received from the services 230-233 may be prioritized, to make effective use of the processing bandwidth of the SM 260. Further details of the processes performed at reference numeral 314 are described in below with reference to FIG. 8.

At reference numeral 316, the security port interface 250 submits a next datagram message or security command request to the SM 260. Here, the next communication to the SM 260 is determined according to the priority order determined at the processes of reference numeral 314, as described in further detail below with reference to FIGS. 9A and 9B. After submitting the next datagram message or security command request to the SM 260 at reference numeral 316, the process 300 proceeds back to reference numeral 310, where the security port interface 250 receives any other datagram messages or security command requests for the V-SMs from the services 230-233.

Although the reference numerals of the processes 310, 312, 314, and 316 are illustrated in a sequential order, it should be appreciated that the embodiments described herein encompass parallel processes and processing. For example the processes identified at reference numerals 310 and 316, for example, may be performed independently and in parallel. Additionally, during the processes at reference numeral 310 and 316, the processes at reference numerals 312 and 314 may be additionally performed independently and in parallel with other processes.

Turning to FIG. 7, a process flow diagram for a process of verifying a datagram message or security command request at reference numeral 312 of FIG. 3 is illustrated according to an example embodiment. At reference numeral 702, a V-SM associated with a received datagram message or security command request determines whether the datagram message or security command request is duplicative. It is noted that the services 230-233 may submit, in certain cases, a plurality of security command requests over time.

In this context, as one feature of the V-SMs, a V-SM may be configured to determine whether a duplicate datagram message or security command request is received. As one example, a received message or request may be considered a duplicate if it is the same as a previous one received within a certain period of time. Duplicate requests may be intercepted and, in some cases, deleted or ignored. It is noted that, in a typical digital video broadcasting system, certain information is repeatedly transmitted for receivers. For example, MPEG, program association table (PAT), program map table (PMT), and security-related conditional access table (CAT) and entitlement control table (EMM/ECM) data may be repeatedly sent at certain frequencies. If the same information is sent to the SM 260, processing power of the SM 260 may be wasted.

In the context above, at reference numeral 702, if a V-SM determines that a received datagram message or security command request is a duplicate request, then the process 312 proceeds to reference numeral 704, where the V-SM may return an error message, delete, or ignore the datagram message or security command request. In this case, the V-SM will not prioritize or submit the message or request for communication to and/or processing by the SM 260. By preventing duplicate messages and requests from being communicated to the SM 260, the embodiments described herein reduce the processing load presented to the SM 260 and facilitate the simultaneous processing of many services by the processing environment 220.

Referring again to FIG. 7, if a received datagram message or security command request is determined not to be duplicative at reference numeral 702, then the process 312 proceeds to reference numeral 706. At reference numeral 706, a V-SM associated with the received datagram message or security command request determines whether it passes a data integrity test. For example, various MPEG data, such as PAT, PMT, and CAT data, may contain on include a CRC checksum. The V-SM can check the integrity of received data using such checksums before transmitting the data to the SM 260. Thus, only valid datagram messages may be sent to the SM 260, saving processing time.

In this context, at reference numeral 706, if a V-SM determines that a received datagram message or security command request does not pass a data integrity test, then the process 312 proceeds to reference numeral 710, where the V-SM may return an error message, delete, or ignore the datagram message or security command request. Alternatively, if the V-SM determines that the received datagram message or security command request does pass the data integrity test, then the process 312 proceeds to reference numeral 708.

At reference numeral 708, one or more V-SM rules may be applied to a received datagram message or security command request. Here, it is noted that, if certain datagram messages or security command requests are tagged with specific identifiers, such as certain packet or datagram identifiers, then certain rule sets and priorities may be enforced on the data. An example rule may specify that packets with certain identifiers should be removed without being communicated to SM 260. Another rule may specify that packets with certain identifiers should be communicated to the SM 260 with high priority. After any V-SM rules are applied at reference numeral 708, the process 312 returns to the overall process 300 of FIG. 3.

FIG. 8 illustrates a process flow diagram for the process of prioritizing a security command request at reference numeral 314 of FIG. 3 according to an example embodiment. Generally, in the process of prioritizing illustrated in FIG. 8, datagram messages and security command requests are prioritized individually and collectively among V-SMs that have been instantiated in the security port interface 250. In certain aspects, the datagram messages and security command requests are prioritized in a V-SM hierarchy determined among the V-SMs and, further, in a queue hierarchy determined within each V-SM.

At reference numeral 802 of FIG. 8, the interface manager 258 prioritizes each of the V-SMs instantiated in the security port interface 250. In various embodiments, the V-SMs may be prioritized equally, or certain V-SMs may be weighted to have a higher priority than others. For example, one or more of the services 230-233 of the processing environment 220 (FIG. 1) may be prioritized based on one or more quality of service requirements of the virtualized security host device 200. In this case, a V-SM associated with a high priority service of the processing environment 220 may be assigned or prioritized higher than another lower priority service of the processing environment 220. Thus, at reference numeral 802, each of the V-SMs instantiated in the security port interface 250 is prioritized with reference to each other V-SM.

From reference numeral 802, the process 314 proceeds to reference numeral 804, where each V-SM in the security port interface 250 prioritizes any received datagram messages and security command requests received from an associated service among the services 230-233. Here, it is noted that the prioritization may be based on various factors, including the priority information associated with respective commands configured for the V-SM (i.e., the priorities of the commands in Tables 12-14), priorities determined based on rules processed by the V-SM itself (i.e., the rules applied at reference numeral 708), or other configuration factors. In this manner, each V-SM offers flexible prioritizing among datagram messages and security command requests. Thus, at reference numeral 804, each of the V-SMs prioritizes any received datagram messages and security command requests in a queue hierarchy.

At reference numeral 804, it is noted that prioritization of datagram messages and security command requests is achieved for each of the V-SMs of the security port interface 250, before the messages and commands are communicated to the SM 260. Thus, in this example embodiment, each V-SM of the security port interface 250 maintains its own queue of datagram messages and/or security command requests, and each V-SM queue is prioritized at the processes of reference numeral 804.

Figure 9A:
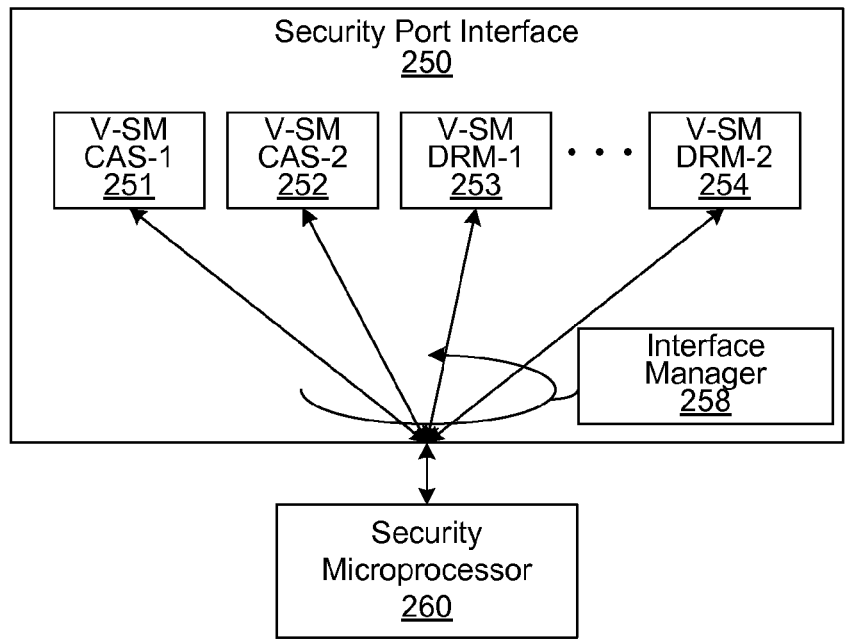
FIG. 9A illustrates an example prioritization scheme among virtual security modules in the security port interface of FIG. 2 according to one embodiment.

In the context of prioritization of V-SMs and queues for V-SMs, FIG. 9A illustrates an example implementation of a prioritization scheme among the SMs 251-254 in the security port interface 250 of FIG. 2 according to one embodiment. As illustrated in FIG. 9A, the interface manager 258, in one embodiment, selects each of the V-SMs 251-254 in a round-robin rotation, giving each of the V-SMs 251-254 an opportunity to communicate with the SM 260 in a sequential order. In the round-robin embodiment of FIG. 9A, each of the V-SMs 251-254 is given an equal opportunity to communicate with the SM 260. Referring back to FIG. 3, the selection of the V-SMs by the interface manager 258 in the round-robin scheme FIG. 9A may be achieved at reference numeral 316, each time the interface manager 258 selects a next datagram message or security command request to submit to the SM 260. In alternative embodiments, certain V-SMs may be given a higher weight or priority in the round-robin scheme.

Figure 9B:
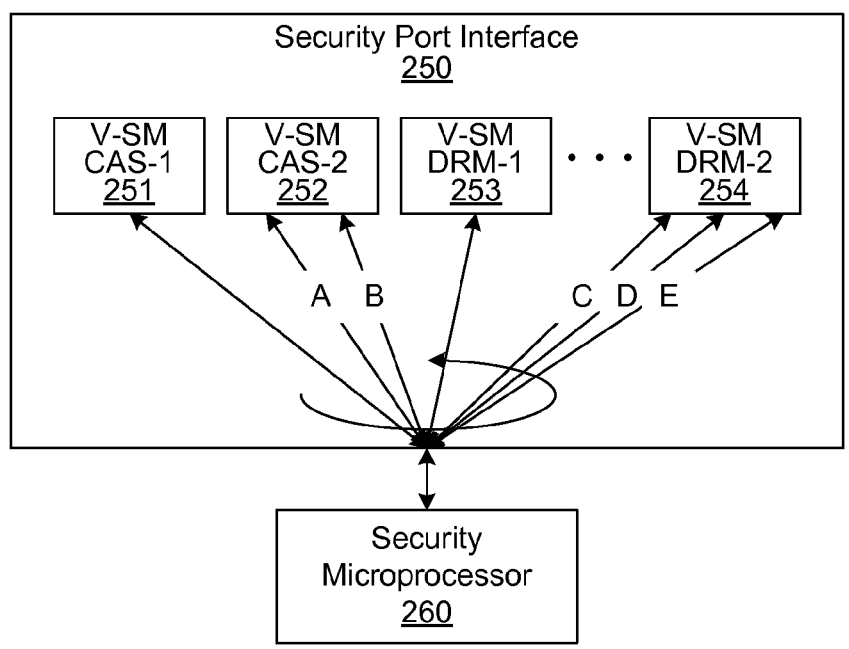
FIG. 9B illustrates another example prioritization scheme among virtual security modules in the security port interface of FIG. 2 according to another embodiment.

FIG. 9B illustrates another example prioritization scheme among the V-SMs 251-254 in the security port interface 250 of FIG. 2 according to another embodiment. As illustrated in FIG. 9B, the interface manager 258 selects each of the V-SMs 251-254 in a round-robin rotation, giving each of the V-SMs 251-254 an opportunity to communicate with the SM 260 in a sequential order. However, in the round-robin embodiment of FIG. 9B, certain V-SMs 251-254 are prioritized or weighted, and provided additional opportunities to communicate with the SM 260.

As illustrated in FIG. 9B, for example, the V-SM 252 is provided two opportunities to communicate with the SM 260 in the round-robin scheme, while the V-SMs 251 and 252 are provided one. Also, the V-SM 254 is provided three opportunities to communicate with the SM 260 in the round-robin scheme, for each round-robin rotation. Further, it is noted that, for the two opportunities of the V-SM 252 to communicate with the SM 260, the V-SM 252 communicates the message or command "A" before the message or command "B". In other words, in the queue of the V-SM 252, the datagram message or security command request "A" is prioritized higher than the datagram message or security command request "B". Similarly, for the V-SM 254, the message or command "C" is a higher priority than "D", and "D" is a higher priority than "E". Here, the prioritization of certain V-SMs and the prioritization within each V-SM may be based on various factors, including the priority information associated with respective commands configured for the V-SM (i.e., the priorities of the commands in Tables 12-14), priorities determined based on rules processed by the V-SM itself (i.e., the rules applied at reference numeral 708), or other configuration factors described herein.

The examples of round-robin priority schemes in FIGS. 9A and 9B are provided by way of example only and other schemes are within the scope and spirit of the embodiments described herein. The schemes generally offer a means to flexibly prioritize datagram messages and security command requests among V-SMs individually and collectively.

Figure 10:
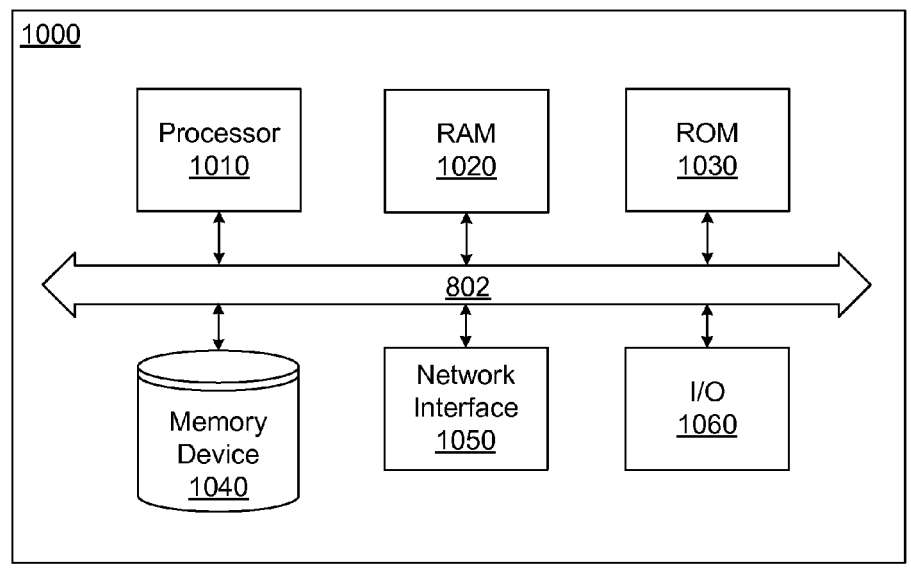
FIG. 10 illustrates an example schematic block diagram of a computing architecture that may be employed by the virtualized security host device of FIG. 2 according to various embodiments described herein.

FIG. 10 illustrates an example schematic block diagram of a computing architecture that may be employed by the virtualized security host device of FIG. 2 according to various embodiments described herein. FIG. 10 illustrates an example schematic block diagram of a computing device 1000 that may be employed by the virtualized security host device 200 of FIG. 2 according to various embodiments described herein. The computing device 1000 may be embodied, in part, using one or more elements of a general purpose computer. The computing device 1000 includes a processor 1010, a Random Access Memory ("RAM") 1020, a Read Only Memory ("ROM") 1030, a memory device 1040, a network interface 1050, and an Input Output ("I/O") interface 1060. The elements of computing device 1000 are communicatively coupled via a bus 1002. The elements of the computing device 1000 are not intended to be limiting in nature, as the device may further include other elements.

In various embodiments, the processor 1010 may comprise any well-known general purpose arithmetic processor, state machine, or Application Specific Integrated Circuit ("ASIC"), for example. In one embodiment, the virtualized security host device may be implemented, in part, by the processor 1010. The processor 1010 may include one or more circuits, one or more microprocessors, ASICs, dedicated hardware, or any combination thereof. In certain aspects embodiments, the processor 1010 is configured to execute one or more software modules. The processor 1010 may further include memory configured to store instructions and/or code to various functions, as further described herein. In certain embodiments, the processor 1010 may comprise a state machine or ASIC, and the processes described in FIGS. 3, 7, and 8 may be implemented or executed by the state machine or ASIC according to a specialized or embedded circuitry design, by firmware, or a combination of a circuitry and firmware.

The RAM and ROM 1020 and 1030 comprise any well-known random access and read only memory devices that store computer-readable instructions to be executed by the processor 1010. The memory device 1040 stores computer-readable instructions thereon that, when executed by the processor 1010, direct the processor 1010 to execute various aspects of the embodiments described herein.

As a non-limiting example group, the memory device 1040 comprises one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The network interface 1050 comprises hardware interfaces to communicate over data networks. The I/O interface 1060 comprises device input and output interfaces such as keyboard, pointing device, display, communication, and/or other interfaces. The bus 1002 electrically and communicatively couples the processor 1010, the RAM 1020, the ROM 1030, the memory device 1040, the network interface 1050, and the I/O interface 1060, so that data and instructions may be communicated among them.

In certain aspects, the processor 1010 is configured to retrieve computer-readable instructions and data stored on the memory device 1040, the RAM 1020, the ROM 1030, and/or other storage means, and copy the computer-readable instructions to the RAM 1020 or the ROM 1030 for execution, for example. The processor 1010 is further configured to execute the computer-readable instructions to implement various aspects and features of the embodiments described herein. For example, the processor 1010 may be adapted or configured to execute the processes described above with reference to FIGS. 3, 7, and 8. In embodiments where the processor 1010 comprises a state machine or ASIC, the processor 1010 may include internal memory and registers for maintenance of data being processed.

The flowcharts or process diagrams of FIGS. 3, 7, and 8 are representative of certain processes, functionality, and operations of embodiments described herein. Each block may represent one or a combination of steps or executions in a process. Alternatively or additionally, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as the processor 1010. The machine code may be converted from the source code, etc. Further, each block may represent, or be connected with, a circuit or a number of interconnected circuits to implement a certain logical function or process step.

Although the flowcharts or process diagrams of FIGS. 3, 7, and 8 illustrate an order, it is understood that the order may differ from that which is depicted. For example, an order of execution of two or more blocks may be scrambled relative to the order shown. Also, two or more blocks shown in succession in FIGS. 3, 7, and 8 may be executed concurrently or with partial concurrence. Further, in some embodiments, one or more of the blocks shown in FIGS. 3, 7, and 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

The invention claimed is:

1. A method, comprising:
   initializing, with a host device, an interface between the host device and a security module;
   instantiating, for one or more services of the host device, one or more virtual security modules of the interface, the one or more virtual security modules instantiated by and hosted within the host device;
   configuring, for at least one command supported by the security module for the one or more services of the host device, a command for the one or more virtual security modules;
   receiving, by the one or more virtual security modules, a plurality of security command requests from the one or more services;
   before submitting the security command requests to the security module, verifying and prioritizing the security command requests with the one or more virtual security modules, wherein prioritizing the security command requests comprises determining a priority level for each of the security command requests for determining an order in which the security command requests are addressed by the security module; and
   for each security command request, when the security command request is verified with one of the virtual security modules, submitting the security command request to the security module.

2. The method of claim 1, wherein, for each security command request, verifying the security command request comprises:
   determining whether the security command request comprises a duplicate request; and
   checking the integrity of the security command request.

3. The method of claim 1, wherein:
   instantiating the one or more virtual security modules comprises instantiating a virtual security module for each of a plurality of services of the host device; and
   configuring a command for the one or more virtual security modules comprises configuring at least one command for each of a plurality of virtual security modules of the host device according to commands supported by the security module for the plurality of services.

4. The method of claim 3, wherein each of the plurality of services of the host device comprises a respective conditional access or digital rights management service.

5. The method of claim 3, wherein:
   receiving a security command request comprises receiving, by the plurality of virtual security modules, a plurality of security command requests from one or more of the plurality of services of the host device; and
   verifying and prioritizing the security command request comprises verifying and prioritizing the plurality of security command requests among the plurality of virtual security modules.

6. The method of claim 5, wherein prioritizing the plurality of security command requests among the plurality of virtual security modules comprises:
   prioritizing the plurality of virtual security modules; and
   prioritizing the security command requests of each of the plurality of virtual security modules.

7. The method of claim 6, wherein submitting the security command request to the security module comprises submitting the plurality of security command requests to the security module based on the respective priorities of the plurality of virtual security modules and the security command requests.

8. The method of claim 1, wherein initializing an interface comprises exchanging, by the host device, operational profile information with the security module, the operational profile information comprising at least hardware or software version information of the host device or the security module.

9. The method of claim 1, wherein instantiating a virtual security module comprises:
   transmitting, to the security module, an instantiation inquiry comprising a service identifier; and
   receiving, from the security module, an instantiation confirmation reply indicating whether the security module supports a service associated with the service identifier.

10. A host device, comprising:
    a security module that supports security requirements of the host device; and
    a security port interface manager including circuitry configured to:
    instantiate one or more virtual security modules for one or more services of the host device and configures at least one command for the one or more virtual security modules, the one or more virtual security modules instantiated by and hosted within the host device;
    verify and prioritize, by the one or more virtual security modules, a plurality of security command requests received from the one or more services, before the plurality of security command requests are communicated to the security module, wherein the security port interface manager is configured to determine a priority level for each of the security command requests for determining an order in which the security command requests are addressed by the security module; and
    communicate the security command requests to the security module after the security command requests are verified and prioritized.

11. The device of claim 10, wherein, for each of the security command requests, the security port interface manager further:
    determines whether the security command request comprises a duplicate request; and
    checks the integrity of the security command request.

12. The device of claim 10, wherein the security port interface manager further:
    instantiates a virtual security module for each of a plurality of services of the host device; and
    configures at least one command for each of a plurality of virtual security modules.

13. The device of claim 10, wherein the security port interface manager further exchanges operational profile information with the security module, the operational profile information comprising at least hardware or software version information of the host device or the security processor.

14. A method, comprising:
    instantiating, for one or more services of the host device, one or more virtual security modules of an interface between the host device and a security module, the one or more virtual security modules instantiated by and hosted within the host device;
    configuring a command for the one or more virtual security modules;
    receiving, by the one or more virtual security modules, a plurality of security command requests from the one or more services;
    before submitting the security command requests to the security module, verifying and prioritizing the security command requests with the one or more virtual security modules, wherein prioritizing the security command requests comprises determining a priority level for each of the security command requests for determining an order in which the security command requests are addressed by the security module; and for each security command request, when the security command request is verified with one of the virtual security modules, submitting the security command request to the security module.

15. The method of claim 14, further comprising, for each of the security command requests, when the security command request is not verified with one of the virtual security modules, ignoring the security command request.

16. The method of claim 14, wherein verifying the security command requests comprises, for each of the security command requests:

determining whether the security command request comprises a duplicate request; and checking the integrity of the security command request.

17. The method of claim 14, wherein:

instantiating the one or more virtual security modules comprises instantiating a virtual security module for each of a plurality of services of the host device; and configuring a command for the one or more virtual security modules comprises configuring at least one command for each of a plurality of virtual security modules of the host device according to commands supported by the security module for the plurality of services.

18. The method of claim 17, wherein each of the plurality of services of the host device comprises a respective conditional access or digital rights management service.

* * * * *